(12) United States Patent
Lumsden

(10) Patent No.: US 10,233,383 B2
(45) Date of Patent: Mar. 19, 2019

(54) METHOD AND COMPOSITIONS FOR ENHANCED OIL RECOVERY

(71) Applicant: Charles A. Lumsden, Greensboro, GA (US)

(72) Inventor: Charles A. Lumsden, Greensboro, GA (US)

(73) Assignee: MONTGOMERY CHEMICALS, LLC, Conshohocken, PA (US)

( * ) Notice: Subject to any disclaimer, the term of this patent is extended or adjusted under 35 U.S.C. 154(b) by 1681 days.

(21) Appl. No.: 13/631,798

(22) Filed: Sep. 28, 2012

(65) Prior Publication Data

US 2013/0020082 A1    Jan. 24, 2013

Related U.S. Application Data

(63) Continuation-in-part of application No. PCT/US2012/030199, filed on Mar. 22, 2012.

(60) Provisional application No. 61/472,003, filed on Apr. 5, 2011.

(51) Int. Cl.
    *E21B 43/20*    (2006.01)
    *C09K 8/588*    (2006.01)
    *C09K 8/584*    (2006.01)

(52) U.S. Cl.
    CPC ............. *C09K 8/588* (2013.01); *C09K 8/584* (2013.01); *E21B 43/20* (2013.01)

(58) Field of Classification Search
    CPC ....................... C09K 8/905; E21B 21/068
    See application file for complete search history.

(56) References Cited

U.S. PATENT DOCUMENTS

| | | | |
|---|---|---|---|
| 2,082,189 A | 6/1937 | Twomey | |
| 2,800,823 A | 7/1957 | Tugend | |
| 2,827,964 A | 3/1958 | Sandiford | |
| 2,923,734 A | 2/1960 | Scheetz | |
| 2,938,017 A | 5/1960 | Grosser | |
| 3,305,016 A | 2/1967 | Lindblom et al. | |
| 3,343,601 A | 9/1967 | Pye | |
| 3,372,749 A | 3/1968 | Williams | |
| 3,399,725 A | 9/1968 | Pye | |
| 3,508,612 A | 4/1970 | Reisberg et al. | |
| 3,580,337 A * | 5/1971 | Gogarty | C09K 8/588 166/270.1 |
| 3,638,728 A | 2/1972 | Hill | |
| 3,792,731 A | 2/1974 | Feuerbacher et al. | |
| 3,811,504 A | 5/1974 | Flournoy et al. | |

(Continued)

FOREIGN PATENT DOCUMENTS

| | | |
|---|---|---|
| CA | 1279315 C | 1/1991 |
| JP | 59091295 A | 5/1984 |

OTHER PUBLICATIONS

"MontBrite 1240® Sodium Borohydride Solution," Montgomery Chemicals, Oct. 26, 2009.*

(Continued)

*Primary Examiner* — Andrew Sue-Ako
(74) *Attorney, Agent, or Firm* — Paul & Paul

(57) ABSTRACT

A flooding fluid for use in petroleum recovery from a petroleum-bearing formation is prepared by mixing an oxygen scavenger consisting essentially of an alkaline aqueous solution of at least one water-soluble borohydride with an aqueous or nonaqueous input fluid having oxygen dissolved therein to reduce the level of dissolved oxygen.

14 Claims, 2 Drawing Sheets

(56) References Cited

U.S. PATENT DOCUMENTS

| | | | |
|---|---|---|---|
| 3,811,507 A | 5/1974 | Flournoy et al. | |
| 3,946,812 A | 3/1976 | Gale et al. | |
| 3,948,740 A | 4/1976 | Phalangas | |
| 3,953,341 A | 4/1976 | Martin | |
| 3,977,471 A | 8/1976 | Gale et al. | |
| 4,008,165 A | 2/1977 | Maddox, Jr. et al. | |
| 4,018,278 A | 4/1977 | Shupe | |
| 4,018,281 A * | 4/1977 | Chang | 166/270.1 |
| 4,059,154 A | 11/1977 | Braden, Jr. et al. | |
| 4,059,533 A | 11/1977 | Watson et al. | |
| 4,060,490 A | 11/1977 | Bernard | |
| 4,066,126 A | 1/1978 | Waite et al. | |
| 4,077,471 A | 3/1978 | Shupe et al. | |
| 4,088,189 A | 5/1978 | Shupe | |
| 4,094,789 A | 6/1978 | Kemper | |
| 4,120,358 A | 10/1978 | Kalfoglou | |
| 4,120,800 A | 10/1978 | Valcho et al. | |
| 4,122,020 A | 10/1978 | Valcho et al. | |
| 4,128,482 A | 12/1978 | Knight | |
| 4,138,345 A | 2/1979 | Williams | |
| 4,143,716 A | 3/1979 | Kalfoglou et al. | |
| 4,157,306 A | 6/1979 | Kalfoglou et al. | |
| 4,161,982 A | 7/1979 | Schievelbein et al. | |
| 4,181,178 A | 1/1980 | Savins | |
| 4,184,549 A | 1/1980 | Schievelbein | |
| 4,187,185 A | 2/1980 | Park et al. | |
| 4,192,382 A | 3/1980 | Schievelbein | |
| 4,192,755 A | 3/1980 | Flournoy et al. | |
| 4,192,767 A | 3/1980 | Flournoy et al. | |
| 4,194,565 A | 3/1980 | Kalfoglou | |
| 4,197,073 A | 4/1980 | Rees et al. | |
| 4,214,999 A | 7/1980 | Carlin et al. | |
| 4,218,327 A | 8/1980 | Wellington | |
| 4,254,249 A | 3/1981 | Cottrell et al. | |
| 4,284,517 A | 8/1981 | Chen et al. | |
| 4,293,428 A | 10/1981 | Gale et al. | |
| 4,295,980 A | 10/1981 | Motz | |
| 4,296,182 A | 10/1981 | Matsubayashi et al. | |
| 4,299,711 A | 11/1981 | Tyler et al. | |
| 4,326,970 A | 4/1982 | Cottrell et al. | |
| 4,331,543 A | 5/1982 | Wilson et al. | |
| 4,340,492 A | 7/1982 | Stournas | |
| 4,343,711 A | 8/1982 | Kalfoglou | |
| 4,406,799 A | 9/1983 | Hunter | |
| 4,408,629 A | 10/1983 | Lafont | |
| 4,414,334 A | 11/1983 | Hitzman | |
| 4,426,302 A | 1/1984 | McCoy et al. | |
| 4,426,303 A | 1/1984 | Nuckels et al. | |
| 4,433,727 A | 2/1984 | Argabright et al. | |
| 4,455,255 A | 6/1984 | Stapp | |
| 4,458,753 A | 7/1984 | Philips et al. | |
| 4,460,481 A | 7/1984 | Schievelbein | |
| 4,468,342 A | 8/1984 | Chen | |
| 4,469,604 A | 9/1984 | Stapp et al. | |
| 4,503,909 A | 3/1985 | Argabright et al. | |
| 4,524,003 A | 6/1985 | Borchardt | |
| 4,532,051 A | 7/1985 | Nuckels nee' Byth et al. | |
| RE32,114 E | 4/1986 | Argabright et al. | |
| 4,580,627 A | 8/1986 | Argabright et al. | |
| 4,629,000 A | 12/1986 | Hurd | |
| 4,632,786 A | 12/1986 | Stapp et al. | |
| 4,633,947 A | 1/1987 | Luetzelschwab | |
| 4,643,253 A | 2/1987 | Shepherd, Jr. et al. | |
| 4,653,584 A | 3/1987 | Ball et al. | |
| 4,720,348 A | 1/1988 | Savins | |
| 4,842,776 A | 6/1989 | Schmidt et al. | |
| 4,852,652 A | 8/1989 | Kuehne | |
| 4,898,819 A | 2/1990 | Linossier | |
| 5,068,043 A | 11/1991 | Thigpen et al. | |
| 5,080,809 A | 1/1992 | Stahl et al. | |
| 5,186,257 A | 2/1993 | Stahl et al. | |
| 5,318,709 A | 6/1994 | Wuest et al. | |
| 5,382,371 A | 1/1995 | Stahl et al. | |
| 5,960,877 A | 10/1999 | Funkhouser et al. | |
| 5,968,879 A | 10/1999 | Onan et al. | |
| 6,022,834 A * | 2/2000 | Hsu et al. | 507/259 |
| 6,030,928 A | 2/2000 | Stahl et al. | |
| 6,051,670 A | 4/2000 | Ahmed et al. | |
| 6,225,263 B1 | 5/2001 | Collins et al. | |
| 6,828,281 B1 | 12/2004 | Hou et al. | |
| 7,091,159 B2 | 8/2006 | Eoff et al. | |
| 7,114,568 B2 | 10/2006 | Eoff et al. | |
| 7,182,136 B2 | 2/2007 | Dalrympel et al. | |
| 7,559,372 B2 | 7/2009 | Cobb | |
| 7,622,428 B2 | 11/2009 | Huff et al. | |
| 7,730,950 B2 | 6/2010 | Nguyen et al. | |
| 7,759,292 B2 | 7/2010 | Eoff et al. | |
| 7,772,162 B2 | 8/2010 | Pope et al. | |
| 7,776,930 B2 | 8/2010 | Ubbels | |
| 7,905,287 B2 | 3/2011 | Olyer et al. | |
| 7,934,557 B2 | 5/2011 | Nguyen | |
| 7,943,555 B2 | 5/2011 | Oyler et al. | |
| 8,091,638 B2 | 1/2012 | Dusterhoft et al. | |
| 8,662,171 B2 * | 3/2014 | Lumsden et al. | 166/270.1 |
| 2007/0125714 A1 | 6/2007 | Reddy | |
| 2008/0011475 A1 * | 1/2008 | Berger et al. | 166/270.1 |
| 2008/0039347 A1 * | 2/2008 | Welton et al. | 507/213 |
| 2011/0232904 A1 | 9/2011 | Lumsden et al. | |

OTHER PUBLICATIONS

International Search Report and Written Opinion dated Dec. 20, 2011 in corresponding International Application No. PCT/US2011/029709 (6 pages).

* cited by examiner

METHOD AND COMPOSITIONS FOR ENHANCED OIL RECOVERY

CROSS-REFERENCE TO RELATED APPLICATIONS

This application is a continuation-in-part of International Application No: PCT/US2012/030199, filed Mar. 22, 2012, which claimed the priority of U.S. Provisional Patent Application No. 61/472,003, filed Apr. 5, 2011.

BACKGROUND OF THE INVENTION

1. Field of the Invention

The present invention relates to a process for preparing fluids for use in petroleum recovery, to fluid compositions for use in petroleum recovery, and to methods for using such fluids in petroleum recovery.

2. Brief Description of the Prior Art

Petroleum recovery from underground formations can be a multistage process. While some petroleum may occur under pressure in such formations and may be extractable using primary processes depending on the pressure of the petroleum in the formation to expel the petroleum from the formation, petroleum often remains after primary processes have become ineffective. In such cases, secondary and tertiary processes may be useful to extract additional petroleum from the formations. In these latter processes, a fluid is typically injected into the formation under pressure through a first well to flood or drive residual petroleum to one or more extraction wells. The flooding fluid can be a gas such as carbon dioxide, or a liquid, such as water obtained locally, such as fresh or sea water. Depending on the nature of the formation, it is often desirable to increase the viscosity of the flooding fluid. This can be accomplished by the addition of a polymeric material to the flooding fluid. The polymeric material may be a natural polymeric material of biological origin, such as, for example, biopolysaccharides, disclosed in U.S. Pat. No. 4,458,753, incorporated herein by reference, or a synthetic polymer, such as, for example, polyacrylamide.

Dissolved oxygen in the flooding fluid can present a number of problems. For example, in the case of biological polymers in particular, dissolved oxygen can accelerate the degradation of the polymer, resulting in an undesirable reduction in the viscosity of the flooding fluid. In addition, dissolved oxygen can have a corrosive effect on equipment used to provide the flooding fluid to the formation, such as pumps, mixing equipment, well casings and the like.

Numerous attempts have been made to reduce the amount of dissolved oxygen in such flooding fluids. For example, U.S. Pat. No. 4,414,334 discloses the use of alcohol to react with dissolved oxygen in the presence of an alcohol oxidase to remove the free oxygen from a fluid. Sodium dithionite compositions have also been employed, such as disclosed in U.S. Patent Publication No. 2011-0232904 A1, incorporated herein by reference. U.S. Pat. No. 4,059,533, incorporated herein by reference, discloses mixtures of sodium dithionite and sodium diothionate as oxygen scavengers in petroleum drilling fluids and in secondary and tertiary recovery operations.

Biopolymers such as xanthan gums, produced by fermentation of using bacteria of the genus *Xanthomonas*, and similar biopolysaccharides, produced by fermentation of bacteria of the genus *Sclerotium* and of the genus *Alcaligenes*, have been used in flooding fluids, such as disclosed in U.S. Pat. No. 3,305,016, U.S. Pat. No. 3,372,749, and British Patent Specification 2,082,189, respectively. U.S. Pat. No. 4,458,753, incorporated herein by reference, discloses the addition of an alkali metal borohydride to an aqueous solution of such biopolysaccharides improves the high temperature stability of the biopolymer. According to U.S. Pat. No. 4,218,327, incorporated herein by reference, the viscosity of xanthan gum-containing flooding fluids can be stabilized by removing substantially all dissolved oxygen, and then adding the xanthan gum polymer, at least one sulfur-containing antioxidant, and at least one easily oxidized water-soluble alcohol or glycol.

When ferric chloride plugging of water-flood flooding wells has been encountered, the addition of a water-soluble hydrosulfite, such as potassium, sodium, or ammonium hydrosulfite has proven to be useful in reducing oxidation of soluble ferrous chloride to insoluble ferric chloride, according to U.S. Pat. No. 3,343,601, incorporated herein be reference. U.S. Pat. No. 3,399,725, incorporated herein by reference, discloses a process for recovering crude oil from subterranean oil-bearing formations, using an aqueous flooding medium substantially free of molecular oxygen, and containing a water-soluble, substantially linear organic polymer. Ferrous ions are encountered in most hydrocarbon-bearing formations, and oxidation to the ferric state can result in degradation of the organic polymer, reducing the efficacy of the recovery process.

When polymeric materials are included in aqueous fluids for use in petroleum recovery, the polymeric material must be dissolved or dispersed in the fluids, typically by mixing operations. Such mixing operations create turbulence, which can simultaneously substantially increase the dissolved oxygen level in the aqueous fluid, to the detriment of subsequent petroleum recovery operations.

There is a continuing need to reduce the dissolved oxygen level of aqueous fluids employed in petroleum recovery operations.

SUMMARY OF THE INVENTION

The present invention provides a process for preparing a flooding fluid for use in petroleum recovery from a petroleum-bearing formation. The process includes providing an input fluid, such as an aqueous fluid, or a non-aqueous fluid such as monoethylene glycol, having oxygen dissolved therein. In one aspect of the invention, the input fluid is aqueous fluid, such as an aqueous brine solution, and in particular, an alkaline aqueous brine solution. The process further includes, in one embodiment, mixing an oxygen scavenger consisting essentially of at least one water-soluble borohydride with the input fluid to reduce the level of dissolved oxygen in the fluid.

In another embodiment, the process further includes mixing an oxygen scavenger comprising at least one water-soluble borohydride with the input fluid to reduce the level of dissolved oxygen in the fluid.

Preferably, the oxygen scavenger is an alkaline aqueous solution including from about 5 to about 20 percent by weight sodium borohydride and from about 30 to about 50 percent by weight sodium hydroxide. More preferably, the alkaline aqueous solution includes from about 10 to about 15 percent by weight sodium borohydride and from about 35 to about 45 percent by weight sodium hydroxide. Still more preferably, the alkaline aqueous solution includes from about 12 to about 14 percent by weight sodium borohydride and from about 37 to about 42 percent by weight sodium hydroxide.

In a presently preferred embodiment, the present invention provides a process for preparing a flooding fluid for use in petroleum recovery from a petroleum-bearing formation, which in this embodiment the process comprises:

(a) providing an input fluid having oxygen dissolved therein;

(b) mixing an oxygen scavenger consisting essentially of an alkaline aqueous solution of at least one water-soluble borohydride with the input fluid to reduce the level of dissolved oxygen in the input fluid;

(c) mixing at least one polymeric material with the input fluid containing the oxygen scavenger to dissolve or disperse the at least one polymeric material in the input fluid to provide a flooding fluid, the quantity of the oxygen scavenger being at least great enough to reduce the level of dissolved oxygen in the flooding fluid to less than a detectable amount;

wherein the water soluble borohydride is sodium borohydride, the and the alkaline aqueous solution includes from about 2 to about 10 percent by weight sodium borohydride, and from about 10 to about 30 percent by weight sodium hydroxide.

Preferably, in this embodiment of the present invention, the alkaline aqueous solution includes from about 4 to about 8 percent by weight sodium borohydride, and from about 15 to about 25 percent by weight sodium hydroxide. More preferably, in this embodiment of the present invention, the alkaline aqueous solution includes from about 5 to about 7 percent by weight sodium borohydride, and from about 17 to about 23 percent by weight sodium hydroxide. Still more preferably, in this embodiment of the process of the present invention, the alkaline aqueous solution includes about 6 percent by weight sodium borohydride, and about 20 percent by weight sodium hydroxide.

The process further optionally includes, within a predetermined period of time after the at least one water-soluble borohydride is mixed with the input fluid, mixing at least one polymeric material with the fluid containing the at least one water-soluble borohydride to dissolve or disperse the at least one polymeric material in the fluid and to thus provide a flooding fluid.

Preferably, the quantity of the at least one water-soluble borohydride is at least great enough to reduce the level of dissolved oxygen in the flooding fluid to less than a detectable amount.

In one aspect of the present process, the predetermined period of time is fifteen seconds. In another aspect of the present process, the predetermined period of time is ten seconds. In yet another aspect of the present process, the predetermined period of time is five seconds.

Preferably, the amount of oxygen scavenger is adjusted such that the flooding fluid contains at least about $6.6 \times 10^{-8}$ moles borohydride per gram of flooding fluid after the dissolved oxygen in the input fluid has been scavenged, and more preferably, the flooding fluid contains from about $6.6 \times 10^{-8}$ to $2.64 \times 10^{-7}$ moles borohydride per gram of flooding fluid after the dissolved oxygen in the input fluid has been scavenged.

Preferably, the at least one water-soluble borohydride is selected from the group consisting of lithium borohydride, sodium borohydride, and potassium borohydride. More preferably, the at least one water-soluble borohydride is sodium borohydride.

The polymeric material can be a synthetic polymeric material or a naturally occurring polymeric material. In one aspect of the present invention, the synthetic polymeric material is preferably an anionic synthetic polymeric material. Preferably, the anionic synthetic polymeric material is selected from the group consisting of polyacrylamides, homopolymers thereof and copolymers thereof with at least one ethylenically unsaturated carboxylic acid. In another aspect, it is preferred that the synthetic polymer is selected from the group consisting of carboxymethylcellulose, hydroxyethylcellulose and carboxymethylhydroxyethylcellulose.

In one aspect, the process of the present invention further includes providing at least one surfactant, and mixing the at least one surfactant with the input fluid such that the flooding fluid further comprises the least one surfactant. Preferably, the at least one surfactant is mixed with the input fluid before the at least one polymeric material is mixed.

In another aspect of the present invention, the oxygen scavenger comprises a basic stabilizing agent and the at least one water-soluble borohydride. In one embodiment of the present invention the basic stabilizing agent is water-soluble base, such as sodium hydroxide or potassium hydroxide. In another embodiment of the present invention, the oxygen scavenger consists essentially of an aqueous solution of sodium hydroxide and at least one water-soluble borohydride.

The present invention also provides a process for petroleum recovery from a petroleum-bearing formation. The process includes providing an input fluid, such as an aqueous fluid, or a non-aqueous fluid such as monoethylene glycol, having oxygen dissolved therein. In one aspect of the invention, the aqueous fluid is an aqueous brine solution, and in particular, an alkaline aqueous brine solution. The process further includes, in one embodiment, of mixing an oxygen scavenger consisting essentially of at least one water-soluble borohydride with the input fluid to reduce the level of dissolved oxygen in the input fluid.

In another embodiment, the process further includes mixing an oxygen scavenger comprising an alkaline aqueous solution comprising at least one water-soluble borohydride with the input fluid to reduce the level of dissolved oxygen in the input fluid.

Preferably, the alkaline aqueous solution includes from about 5 to about 20 percent by weight sodium borohydride and from about 30 to about 50 percent by weight sodium hydroxide. More preferably, the alkaline aqueous solution includes from about 10 to about 15 percent by weight sodium borohydride and from about 35 to about 45 percent by weight sodium hydroxide. Still more preferably, the alkaline aqueous solution includes from about 12 to about 14 percent by weight sodium borohydride and from about 37 to about 42 percent by weight sodium hydroxide.

The process further optionally includes, preferably within a predetermined period of time after the at least one water-soluble borohydride is mixed with the input fluid, mixing at least one polymeric material with the input fluid containing the at least one water-soluble borohydride to dissolve or disperse the at least one polymeric material in the input fluid and to thus provide a flooding fluid.

Preferably, the predetermined period of time is 30 seconds, more preferably 15 seconds, and still more preferably, 10 seconds. Preferably, the quantity of the at least one water-soluble borohydride is at least great enough to reduce the level of dissolved oxygen in the flooding fluid to less than a detectable amount.

The process further comprises injecting the flooding fluid into the petroleum-bearing formation; and extracting residual petroleum from the petroleum-bearing formation. Preferably, the amount of oxygen scavenger is adjusted such that the flooding fluid contains at least about $6.6 \times 10^{-8}$ moles borohydride per gram of flooding fluid after the dissolved oxygen in the fluid has been scavenged, and more preferably, the flooding fluid contains from about $6.6 \times 10^{-8}$ to $2.64 \times 10^{-7}$ moles borohydride per gram of flooding fluid after the dissolved oxygen in the input fluid has been scavenged.

Preferably, the at least one water-soluble borohydride is selected from the group consisting of lithium borohydride, sodium borohydride, and potassium borohydride. More preferably, the at least one water-soluble borohydride is sodium borohydride.

The polymeric material can be a synthetic polymeric material or a naturally occurring polymeric material. In one aspect of the present invention, the synthetic polymeric material is preferably an anionic synthetic polymeric material. Preferably, the anionic synthetic polymeric material is selected from the group consisting of polyacrylamides, homopolymers thereof and copolymers thereof with at least one ethylenically unsaturated carboxylic acid. In another aspect, it is preferred that the synthetic polymer is selected from the group consisting of carboxymethylcellulose, hydroxyethylcellulose and carboxymethylhydroxyethylcellulose. In another aspect, the polymeric material is a synthetic polymeric material selected from the group consisting of polyacrylamides, homopolymers thereof and copolymers thereof with at least one ethylenically unsaturated carboxylic acid, carboxymethylcellulose, hydroxyethylcellulose and carboxymethylhydroxyethylcellulose.

In one aspect, the process of the present invention further includes providing at least one surfactant, and mixing the at least one surfactant with the fluid such that the flooding fluid further comprises the least one surfactant. Preferably, the at least one surfactant is mixed with the fluid before the at least one polymeric material is mixed.

In another aspect of the present invention, the oxygen scavenger comprises a basic stabilizing agent and the at least one water-soluble borohydride. In one embodiment of the present invention the basic stabilizing agent is water-soluble base, such as sodium hydroxide or potassium hydroxide. In another embodiment of the present invention, the oxygen scavenger consists essentially of an aqueous solution of sodium hydroxide and at least one water-soluble borohydride.

In another aspect, the present invention provides a flooding fluid for enhance oil recovery from subterranean formations.

In one aspect, the flooding fluid consists essentially of water, at least one water-soluble borohydride, and a polymeric material, the fluid having dissolved oxygen in a concentration less than a detectable amount.

In another aspect, the flooding fluid comprises a non-aqueous fluid, preferably monoethylene glycol, at least one water-soluble borohydride, and a polymeric material, the fluid having dissolved oxygen in a concentration less than a detectable amount.

In another aspect, the aqueous flooding fluid comprises water, at least one water-soluble borohydride, and a polymeric material, the fluid having dissolved oxygen in a concentration less than a detectable amount. In yet another aspect, the flooding fluid further includes at least one aqueous base. Preferably, the at least one water-soluble borohydride is sodium borohydride. Preferably, the level of base is sufficient to provide a pH of from about 9 to about 12. Preferably, the concentration of the sodium borohydride is from about 5 ppm to 200 ppm, more preferably from about 10 ppm to 100 ppm, still more preferably from about 25 ppm to 50 ppm.

DETAILED DESCRIPTION

Figure 1:
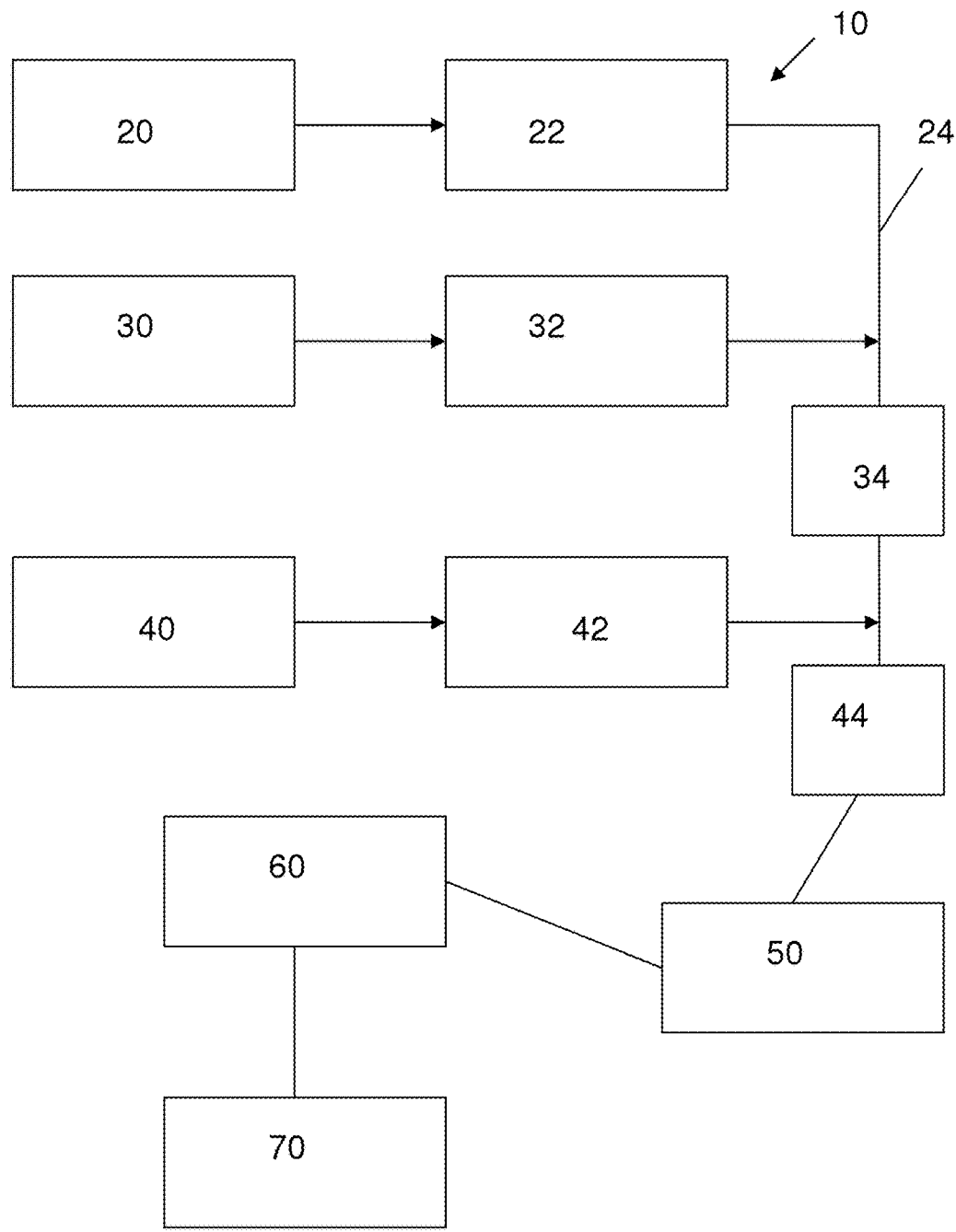
FIG. 1 is a block diagram showing an embodiment of the process of the present invention.

The process of the present invention provides a very rapid reduction in the level of dissolved oxygen in the water or another aqueous fluid or a nonaqueous fluid such as monoethylene glycol being used in secondary and tertiary or "enhanced" petroleum recovery operations from subterranean formations. The process permits rapidly preparing a flooding fluid, including a polymeric material with a very low level of dissolved oxygen. The level of dissolved oxygen can be reduced almost instantaneously to below detectable levels using the present process. By "less than a detectable concentration" or "less than a detectable amount" of dissolved oxygen is meant a level of dissolved oxygen characterized by an oxygen reduction potential of less than −1000 mV.

The process can be used to prepare aqueous and nonaqueous flooding fluids for use in polymer flooding petroleum recovery operations, in surfactant-polymer ("SP") flooding petroleum recovery operations, and in alkaline-surfactant-polymer ("ASP") petroleum recovery operations.

The fluid employed in the process of the present invention can be any type of aqueous or non-aqueous fluid employed in secondary and/or tertiary petroleum recovery operations. For example, the aqueous fluid can be fresh water obtained from the local domestic water supply or from local wells, or recycled or reclaimed water. Alternatively, the aqueous fluid can be brine obtained from local saltwater sources, or a brine prepared by adding suitable inorganic materials to fresh water, such as by adding soda ash (sodium carbonate) to provide an alkaline solution, such as an alkaline solution having a pH of from about 9 to 11, generally known in the art as a "produced" brine. Alkaline brines can be produced by the addition of caustic soda, sodium silicate, or sodium hydroxide. Such produced brines frequently have a high concentration of divalent ions such as greater than 1000 ppm. Alkaline solutions may be preferred depending on the nature of the petroleum in the subterranean formation, as well as the nature of subterranean formation itself. For example, the petroleum may contain acidic materials such as naphthalenic acids that can be converted by chemical reaction with the alkaline solution to surfactant material (soaps) beneficial to the recovery operation. The alkaline solution may also enhance oil recovery by reducing the amount of added surfactant which is retained by the rock in the subterranean formation.

The input fluid can also be a nonaqueous fluid such as organic diols, triols, and the like, such as monoethylene glycol, diethylene glycol, triethylene glycol, and polyethylene glycols.

Polymeric materials are preferably added to and mixed with the input fluid in the process of the present invention, to dissolve or disperse the polymeric material in the input fluid. Preferably water-soluble polymeric materials are employed in the process such that adding and mixing the water-soluble polymeric materials provides a solution of the polymeric material in the input fluid. The amount and type of water-soluble polymeric material to be added and mixed with the input fluid depends upon the hydrophobic/hydrophilic balance of the input fluid, the viscosity desired for the flooding fluid, and the characteristics of the subterranean formation. Increasing the viscosity of the flooding fluid can increase the amount of petroleum recovered, depending on the characteristics of the specific subterranean formation, as can be determined by those skilled in the art.

Examples of polymers that can be employed in the process of the present invention include synthetic polymers such as homopolymers and copolymers of ethylenically unsaturated monomers, including, for example, acrylic acid, methacrylic acid, itaconic acid, vinyl sulfonic acid, ethyl methacrylate, butyl acrylate, lauryl acrylate, methyl methacrylate, hydroxyethyl acrylate, acrylamide, methacrylamide, vinyl acetate, vinyl propionate, and the like. Further, chemically modified derivatives of such polymers can be employed, such as partially hydrolyzed polyacrylamide. Additional examples include polysaccharides such as cellulose derivatives including hydroxymethyl cellulose, hydroxyethyl cellulose, carboxymethyl cellulose, and carboxymethylhydroxyethyl cellulose. Biologically derived polymeric materials can also be employed, including gums such as guar gum and xanthan gum, and chemically modified derivatives thereof.

Polymers that can be employed in the process and compositions of the present invention are disclosed, for example, in U.S. Pat. Nos. 2,827,964, 2,923,734, 2,938,017, 3,948,740, 3,953,341, 4,060,490, 4,128,482, 4,254,249, 4,326,970, 4,406,799, 4,433,727, 4,503,909, 4,508,629, 4,524,003, 4,580,627, 4,633,947, 4,653,584, 4,852,652, 5,080,809, 5,186,257, 5,382,371, 5,960,877, 5,968,879, 6,030,928, 6,051,670, 7,091,159, 7,114,568, 7,182,136, 7,622,428, 7,730,950, 7,759,292, 7,905,287, 7,934,557, 7,943,555, 8,091,638, and RE32,114, each incorporated herein by reference.

Typically, a small amount of polymeric material (such as, for example, from about 200 to 1000 mg/l or ppm) of a water-soluble polymer is employed in order to increase the viscosity of the flooding fluid or "flood" used in flooding the subterranean petroleum formation and thus reduce the mobility of the fluid used to flood the formation. Polymeric materials having a high molecular weight, such as from about 2 to 5 million, are preferred. Many different types of polymers have been proposed and evaluated for use in enhanced oil recovery systems. These include polyacrylamides, polyvinyl-pyrrolidones, hydroxyethylcelluloses, cellulose sulfate esters, guar gums, xanthan gums, and scleroglucans. Polymeric materials are useful to restrict the mobility of the flooding fluid so that the flooding fluid does not travel through the formation more quickly than the residual petroleum in the formation. The polymeric material may adsorb to formation surfaces and fill pores in the formation rock, thereby forcing the flooding fluid into previously unflooded portions of the formation, increasing the amount of petroleum recovery.

Optionally surfactants can be included in the flooding fluids of the present invention. Such surfactants can be added to the aqueous fluid prior to the addition of the oxygen scavenger, or subsequently, or premixed with the oxygen scavenger and/or polymeric material. Examples of surfactants that can be employed include ethoxylated alcohols, sulfonated oxyalkylated alcohols, polyalkylene glycol alkyl ethers, and the like. Surfactants that can be used in preparing the flooding fluids of the present invention are disclosed, for example, in U.S. Pat. Nos. 3,508,612, 3,638,728, 3,792,731, 2,800,823, 3,811,504, 3,811,507, 3,946,812, 3,977,471, 4,008,165, 4,018,278, 4,059,154, 4,066,126, 4,077,471, 4,088,189, 4,094,789, 4,120,358, 4,120,800, 4,122,020, 4,138,345, 4,143,716, 4,157,306, 4,161,982, 4,181,178, 4,184,549, 4,187,073, 4,187,185, 4,192,382, 4,192,755, 4,192,767, 4,194,565, 4,214,999, 4,284,517, 4,293,428, 4,295,980, 4,296,812, 4,2299,711, 4,331,543, 4,340,492, 4,343,711, 4,426,302, 4,426,303, 4,455,254, 4,455,255, 4,460,481, 4,468,342, 4,469,604, 4,532,051, 4,629,000, 4,632,786, 4,643,253, 4,720,348, 4,842,776, 5,068,043, 5,318,709, 6,225,263, 6,828,281, 7,559,372, 7,772,162, and 7,776,930, each incorporated herein by reference.

The preparation of aqueous borohydride compositions suitable for use in the present invention is disclosed, for example, in U.S. Pat. No. 6,866,689, incorporated herein by reference. While sodium borohydride is preferred, other borohydrides such as lithium borohydride, potassium borohydride, sodium cyanoborohydride, and mixtures thereof, can be employed.

Materials to be added to the aqueous fluid can be added using any process and equipment known to the art, such as by conventional feed pumps, by mixing in mud pits, and the like. Preferably, however, methods of addition known to increase the level of dissolved oxygen in the aqueous fluid are to be avoided. Further, materials to be mixed with the aqueous fluid can be mixed using any process and equipment known to the art, such mixing using one or more static mixers interposed in the flow of the aqueous fluid. However, since some mixing equipment and techniques are known to increase the level of dissolved oxygen in the aqueous fluid they are to be avoided if practicable.

Preferably, data concerning a specific subterranean formation are collected before selecting the composition of the aqueous fluid to be used to flood the formation in an enhanced oil recovery operation. For example, the formation can be logged, samples of the formation rock and the petroleum can be taken, and a static and or dynamic model for the formation can be developed using modeling software. Flow of petroleum in the formation depends on a number of forces, including viscous forces, capillary forces and gravity. Simulation software can be employed to predict the effect of different methods of enhanced oil recovery on the specific formation. Sample cores can be obtained from the formation and their flood characteristics evaluated. Similarly, pilot wells can be drilled and flooded to provide further information about the flood characteristics of the formation. Further, comparisons with effects of various methods of enhanced oil recovery on formations having similar characteristics can be made.

The flooding fluid can also include one or more surfactants such as petroleum sulfonates, or rhamnolipids, in order to reduce the interfacial tension or capillary pressure that would otherwise impede the flow of petroleum through the subterranean formation.

FIG. 1 is a block diagram illustrating an embodiment of the process 10 of the present invention. A holding tank 20 contains a quantity of fresh water obtained from a local well (not shown). The fresh water 20 is pumped by a first metering pump 22 into a line 24. An aqueous mixture of sodium borohydride and sodium hydroxide 30 is pumped by a second metering pump 32 into the line 24 and the mixture of the fresh water and sodium hydroxide and sodium borohydride flow through a first static mixer 34. An aqueous polymer solution 40 is pumped by a third metering pump 42 into the line 24. The mixture of the fresh water, sodium hydroxide, sodium borohydride, and aqueous polymer solution (or flood fluid) flows through a second static mixer 44 to an injection pump 50 which injects the flood fluid to a petroleum-bearing subterranean formation 60, whereby the flood fluid forces residual petroleum in the formation 60 to one or more collection wells 70 which extract the residual petroleum.

EXAMPLE

A field trial was carried out to verify lab work using the MontBrite™ (Montgomery Chemicals, Conshohocken Pa.) 1240 (aqueous solution of 12 percent by weight sodium borohydride and 40 percent by weight sodium hydroxide) to function at scale and effectively scavenge oxygen from the incoming water stream. After introduction of oxygen scavenger both surfactant and polymer were added to the stream and a sample was taken downstream for measurement.

Ammonium bisulfite (a standard oxygen scavenger) showed no detectable action up to 200 ppm given the short residence time of approximately six seconds before sampling.

Montgomery Chemicals dithionite mixture injected at 75 ppm and above resulted in a reading of 0 ppb on a Chemets DO (dissolved oxygen) test (CHEMetrics, Inc., Midland, Va.) with an ORP (oxygen reduction potential) reading of approximately −50 mV. At closer to 200 ppm the DO remained undetectable and the ORP was below −700 mV.

Sodium borohydride solution was also injected alone from 25-200 ppm resulting in a negative ORP of around −200 mV at 25 ppm and below −1000 mV at over 50 ppm. The CHEMets test kit could not be used to detect DO since the concentration of borohydride in the solution interfered with the colorimetric redox reaction in the kit. The consensus was that with such a low ORP oxygen is no longer present or is at very least inert.

The objective of this trial was to verify that the MontBrite 1240 chemistry (sodium dithionite, also known as sodium hydrosulfite) would be effective in rapidly reducing the dissolved oxygen (DO) content of incoming makeup water.

Figure 2:
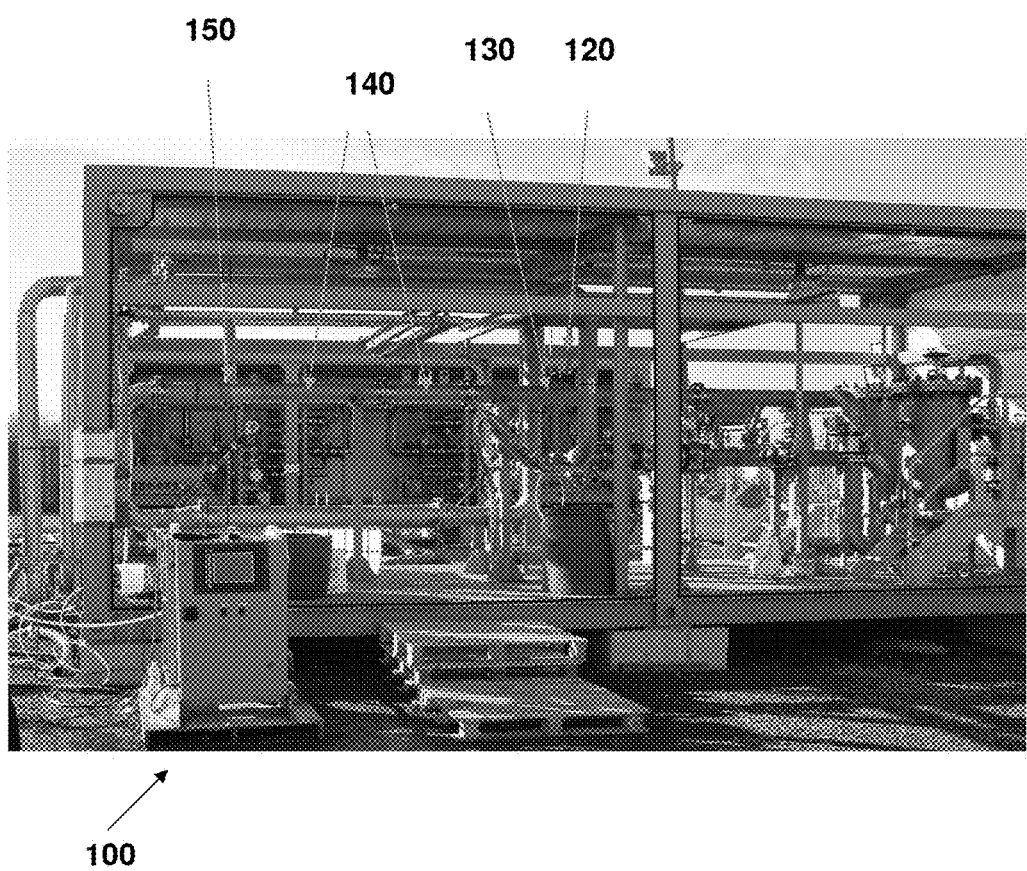
FIG. 2 is a photograph showing the configuration of the apparatus used to carry out a field test of the process of the present invention.

The physical configuration of the makeup skid 100 can be seen in FIG. 2. The skid includes an oxygen scavenger flooding or injection point 120, a surfactant flooding or injection point 130, static mixers 140, and a polymer flooding or injection point 150.

The total residence time between initial oxygen scavenger flooding and sampling is approximately six seconds after going through two sequential static mixers during which both surfactant and polymer are added. To prevent degradation the DO needs to be as close to zero as possible after the introduction of polymer.

On each of two days, three different oxygen scavenger additions ("floodings") were planned. Ammonium bisulfite was used as a control as it represents a standard oxygen scavenger chemistry (Nalco Company, Naperville, Ill.) Floodings from 25 ppm to 100 ppm were planned to establish how effective the material was in rapidly decreasing the DO prior to being sampled. Sodium dithionite floodings were planned, ranging from 25 ppm to 200 ppm, to determine both DO content and ORP in the makeup stream. Lastly, floodings of sodium borohydride ranging from 25 ppm to 100 ppm were planned to determine whether the dithionite mixture was required or if only borohydride would be able to reduce the oxygen content in the makeup stream. Between floodings of different chemistries the lines were flushed with water until baseline readings were observed from the inline probes. Upon initial chemical flooding and between floodings, data at to set point changes was only taken when inline instrumentation indicated steady state values.

Sampling was performed via two different methods. First, pH and ORP were monitored continuously using an inline ORP and pH probe which were connected through the sampling port with a continuous leak rate of approximately 100 mL/min. Secondly, sample bombs were placed on various sample ports downstream with corresponding residence times between 30 seconds and 3 minutes at stable concentrations of oxygen scavengers for testing in a lab equipped with an anaerobic chamber.

Trial 1:

This trial was performed using water from the local water supply without the addition of any other materials. The baseline pH was approximately 7 for this trial with the flow rate held constant for the duration of the trial at 4800±10% barrels per day (bpd; 1 bbl=42 US gal). Line pressure was between 50-60 PSIG.

Due to a chemical labeling issue (borohydride solution labeled as ammonium bisulfite and vice versa) borohydride was injected at approximately 200 ppm, resulting in data contrary to what was expected, which resulted in a limited dataset being collected given the time involved in determining the problem and being able to assure all of the other chemical labels were correct before proceeding.

Additionally, due to a clog in the mixing unit's Coriolis flow meter which controls the flow rate of borohydride, the strength of the resulting dithionite mix was exceptionally low with an ORP in the makeup tank of only −600 mV. The reading was expected to be below −1000 mV, which represents the lowest reading the ORP probe can measure. Estimated dithionite concentrations injected are believed to be between 5-10 ppm at maximum flow rates tested. The results are provided in Table 1 below.

TABLE 1

| Oxygen Scavenger | Concentration (ppm) | pH | ORP(mV) | DO | Comments |
|---|---|---|---|---|---|
| {Baseline} | — | 7 | +80 | 2 ppm | |
| Borohydride | 50 | 8.3 | <−1000 | b | a |
| Borohydride | 100 | 9.1 | <−1000 | b | a |
| Borohydride | 200 | 10.4 | <−1000 | b | a |
| Bisulfite | 100 | 7 | +70 | 2 ppm | |
| Bisulfite | 150 | 6.8 | +50 | 2 ppm | |
| Bisulfite | 200 | 6.5 | +40 | 2 ppm | |
| Dithionite | ~2 | 7 | −10 | 1 ppm | c |
| Dithionite | ~4 | 7 | −20 | d | c |
| Dithionite | ~10 | 7 | −80 | d | c | a. The CHEMets DO test was confounded by the strong reducing environment created by the borohydride.
b. At time of flooding, this was thought to be ammonium bisulfite.
c. Concentration is approximate since the exact makeup concentration is unknown due to problems with flow meter on skid.
d. Data could not be recorded due to observation of flooding pump performance.

Trial 2:

This trial was performed using brine water treated with soda ash with a pH of approximately 10.6, which represents the ideal conditions for the polymer solution to be introduced into the stream. The flow rate was maintained at 4800±10% bpd for the duration of the trial. Line pressure was between 50-60 PSIG.

Due to concerns about the reliability of the mixing skid, two 20-liter batches were mixed by hand into pails at an 8:1 ratio sodium bisulfite:sodium borohydride. The final concentration of bisulfite was 250 mL/L with the borohydride at 31.25 mL/L and the balance comprised of water. This material was mixed by sequential shaking and venting of produced hydrogen gas until no further gas was evolved. When feeding from the dithionite pails, duct tape was used to seal off the opening to limit the amount of oxygen that could diffuse into the dithionite mixture. The results of the second trial are provided in Table 2.

TABLE 2

| Oxygen Scavenger | Concentration (ppm) | pH | ORP(mV) | DO | Comments |
|---|---|---|---|---|---|
| {Baseline} | — | 10.6 | +40 | 2 ppm | |
| Bisulfite | 50 | 10.6 | +40 | 2 ppm | |
| Bisulfite | 100 | 10.6 | +40 | 2 ppm | |
| Dithionite | 50 | 10.6 | −300 | <5 ppb | |
| Dithionite | 75 | 10.6 | −600 | 0 ppb | |
| Dithionite | 100 | 10.6 | −800 | 0 ppb | |
| Dithionite | 200 | 10.6 | <−1000 | 0 ppb | |
| Borohydride | 50 | 10.6 | <−1000 | a | |
| Borohydride | 75 | 10.6 | <−1000 | a | |
| Borohydride | 100 | 10.6 | <−1000 | a | | a. The CHEMets DO test was confounded by the strong reducing environment created by the borohydride.

Conclusions

Ammonium bisulfite did not have sufficient time to react with the oxygen to affect the DO readings appreciably after polymer flooding. It is not suitable for use in this application since the polymer will be exposed to a high oxygen concentration upon flooding and mixing. Further downstream data may indicate a decrease in oxygen concentration. Such data is not currently available.

Sodium dithionite appears to be effective in reducing the oxygen concentration to below detectable limits at over 75 ppm. With concentrations above 75 ppm the ORP continues to decrease to below detectable limits. The pH of the mixture remains unchanged and the CHEMets test kits are unaffected by the chemistry.

Sodium borohydride addition produces an undetectably low (<−1000 mV) ORP reading at concentrations below 50 ppm. When sodium borohydride is added to the soda ash containing brine solution, it does not appreciably change the pH of the system despite the high caustic concentration. Unfortunately the effect on dissolved oxygen is inconclusive as the borohydride interferes with the CHEMets test kits, preventing an accurate DO reading. Further lab-scale experimentation is planned to confirm the feasibility of using solely sodium borohydride as an effective oxygen scavenger.

Various modifications can be made in the details of the various embodiments of the processes, compositions and articles of the present invention, all within the scope and spirit of the invention and defined by the appended claims.

The invention claimed is:

1. A process for preparing a flooding fluid for use in petroleum recovery from a petroleum-bearing formation, the process comprising:
  (a) providing an input fluid having oxygen dissolved therein;
  (b) mixing an oxygen scavenger consisting essentially of an alkaline aqueous solution of at least one water-soluble borohydride with the input fluid to reduce the level of dissolved oxygen in the input fluid;
  (c) mixing at least one polymeric material with the input fluid containing the oxygen scavenger to dissolve or disperse the at least one polymeric material in the input fluid to provide a flooding fluid, the quantity of the oxygen scavenger being at least great enough to reduce the level of dissolved oxygen in the flooding fluid to less than a detectable amount;
  wherein the water soluble borohydride is sodium borohydride, the and the alkaline aqueous solution includes from about 2 to about 10 percent by weight sodium borohydride, and from about 10 to about 30 percent by weight sodium hydroxide, and
  wherein the polymeric material is an anionic synthetic polymeric material selected from the group consisting of polyacrylamides, homopolymers thereof and copolymers thereof with at least one ethylenically unsaturated carboxylic acid.

2. A process according to claim 1 wherein the alkaline aqueous solution includes from about 4 to about 8 percent by weight sodium borohydride, and from about 15 to about 25 percent by weight sodium hydroxide.

3. A process according to claim 2 wherein the alkaline aqueous solution includes from about 5 to about 7 percent by weight sodium borohydride, and from about 17 to about 23 percent by weight sodium hydroxide.

4. A process according to claim 3 wherein the alkaline aqueous solution includes about 6 percent by weight sodium borohydride, and about 20 percent by weight sodium hydroxide.

5. A process according to claim 1 wherein the polymeric material is mixed with the aqueous fluid containing the oxygen scavenger within a predetermined period of time, the predetermined period of time being fifteen seconds.

6. A process according to claim 1 wherein the amount of oxygen scavenger is adjusted such that the flooding fluid contains at least about $6.6 \times 10^{-8}$ moles borohydride per gram of flooding fluid after the dissolved oxygen in the input fluid has been scavenged.

7. A process according to claim 6 wherein the flooding fluid contains from about 6.6×10−8 to $2.64 \times 10^{-7}$ moles borohydride per gram of flooding fluid after the dissolved oxygen in the input fluid has been scavenged.

8. A process according to claim 1 wherein the input fluid is a nonaqueous fluid.

9. A process according to claim 8 wherein the nonaqueous fluid comprises monoethylene glycol.

10. The process according to claim 1 further comprising providing at least one surfactant, the flooding fluid further comprising the least one surfactant.

11. The process according to claim 10 wherein the at least one surfactant is mixed with the input fluid before the at least one polymeric material is mixed.

12. A process for oil recovery from an oil-bearing formation, the process comprising:
  (a) providing an input fluid having oxygen dissolved therein;
  (b) mixing an oxygen scavenger consisting essentially of an aqueous solution of at least one water-soluble borohydride and sodium hydroxide with the input fluid to reduce the level of dissolved oxygen in the input fluid,
  wherein the water soluble borohydride is sodium borohydride, the and the alkaline aqueous solution includes from about 2 to about 10 percent by weight sodium borohydride, and from about 10 to about 30 percent by weight sodium hydroxide;
  (c) within a predetermined period of time thereafter mixing at least one polymeric material with the input fluid containing the at least one water-soluble borohydride to dissolve or disperse the at least one polymeric material in the input fluid to provide an aqueous flooding fluid, the quantity of the at least one water-soluble borohydride being at least great enough to reduce the level of dissolved oxygen in the flooding fluid to less than a detectable amount, wherein the polymeric material is an anionic synthetic polymeric material selected from the group consisting of polyacrylamides, homopolymers thereof and copolymers thereof with at least one ethylenically unsaturated carboxylic acid;

(d) injecting the flooding fluid into the oil-bearing formation; and (e) extracting residual oil from the oil-bearing formation.

13. A process according to claim 12 wherein the predetermined period of time is five seconds.

14. A process according to claim 12 wherein the flooding fluid contains from about $6.6 \times 10^{-8}$ to $2.64 \times 10^{-7}$ moles borohydride per gram of flooding fluid after the dissolved oxygen in the input fluid has been scavenged.

* * * * *